United States Patent
Payne et al.

(10) Patent No.: US 8,842,359 B1
(45) Date of Patent: Sep. 23, 2014

(54) SPATIAL LIGHT MODULATOR WITH MULTIPLE LINEAR ARRAYS

(75) Inventors: Alexander Payne, Ben Lomond, CA (US); James Hunter, Campbell, CA (US)

(73) Assignee: Silicon Light Machines Corporation, Sunnyvale, CA (US)

( * ) Notice: Subject to any disclaimer, the term of this patent is extended or adjusted under 35 U.S.C. 154(b) by 0 days.

(21) Appl. No.: 13/429,091

(22) Filed: Mar. 23, 2012

(51) Int. Cl.
*G02B 26/08* (2006.01)

(52) U.S. Cl.
CPC .................................. *G02B 26/0841* (2013.01)
USPC ......................................................... 359/291

(58) Field of Classification Search
USPC ................ 359/237–324, 201.1, 201.2, 212.1, 359/223.1, 224.1, 224.2, 566, 569, 572, 359/573, 578, 584, 585; 347/239, 255; 385/37; 345/84, 85

See application file for complete search history.

(56) References Cited

U.S. PATENT DOCUMENTS

| | | | |
|---|---|---|---|
| 6,552,777 | B2 | 4/2003 | Sunagawa |
| 8,199,178 | B1 | 6/2012 | Payne |
| 2006/0098266 | A1 * | 5/2006 | Payne et al. .................... 359/291 |
| 2010/0208329 | A1 * | 8/2010 | Sandstrom et al. ........... 359/291 |
| 2012/0081681 | A1 * | 4/2012 | Nakazawa et al. .............. 355/53 |

* cited by examiner

*Primary Examiner* — Darryl J Collins
*Assistant Examiner* — Gary O'Neill
(74) *Attorney, Agent, or Firm* — William Nuttle (57) ABSTRACT

A system including spatial light modulators with multiple one-dimensional (1D) diffractor arrays and methods of operating the same are provided. In one embodiment, the system comprises a spatial light modulator (SLM) assembly including a plurality of one-dimensional (1D) diffractor arrays to modulate light from a light source, the plurality of 1D diffractor arrays integrally formed on a die; illumination optics disposed in a light path between the plurality of 1D diffractor arrays and the light source to illuminate a substantially linear portion of at least one of the plurality of 1D diffractor arrays; and imaging optics disposed in a light path between the SLM assembly and an image plane on a target-substrate, the imaging optics adapted to transmit modulated light from the SLM assembly to a substantially linear portion of the image plane. Other embodiments are also provided.

20 Claims, 10 Drawing Sheets

SPATIAL LIGHT MODULATOR WITH MULTIPLE LINEAR ARRAYS

TECHNICAL FIELD

The present invention relates generally to spatial light modulators, and more particularly to systems including spatial light modulators with multiple one-dimensional (1D) diffractor arrays and to methods of operating the same.

BACKGROUND

Spatial light modulators or SLMs include an array of one or more devices that can control or modulate an incident beam of light in a spatial pattern that corresponds to an electrical input to the devices. The incident light beam, typically generated by a laser, can be modulated in intensity, phase, polarization or direction. Some modulation can be accomplished through the use of Micro-Electromechanical System devices (MEMs) that use electrical signals to move micromechanical structures to modulate light incident thereon. Spatial light modulators are increasingly being developed for use in various applications, including display systems, optical information processing and data storage, printing, and maskless lithography.

Figure 1A:
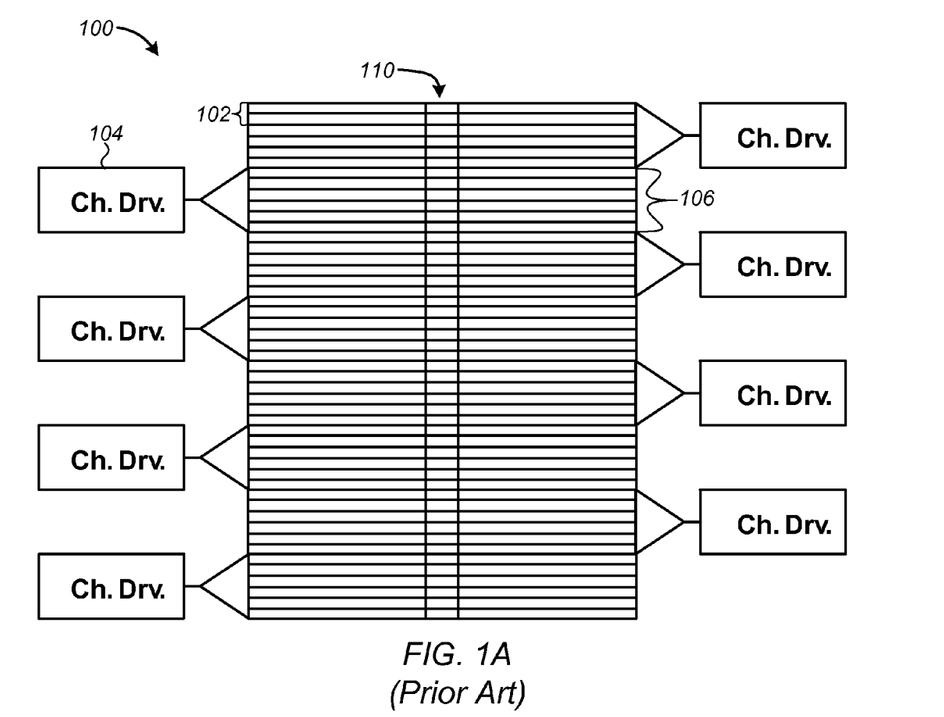
FIG. 1A (Prior Art) is a schematic block diagram of a planar top view of an array of ribbon-type diffractors for use in a conventional spatial light modulator (SLM)

FIG. 1 shows a linear, one-dimensional (1D) array of ribbon-type diffractors for use in a SLM. Generally, the linear array consists of a number of active (movable) ribbons are interlaced between static bias ribbons. By displacing the active ribbons, relative to the static ribbons, a square-well diffraction grating is formed along the long axis of the array. In the embodiment shown, several ribbon pairs are ganged under action of a single channel driver to form a single MEMS pixel. By assembling a large number of MEMS pixels and drivers, a continuous, programmable diffraction grating results, such as is particularly useful in printing and lithography applications.

Figure 1B:
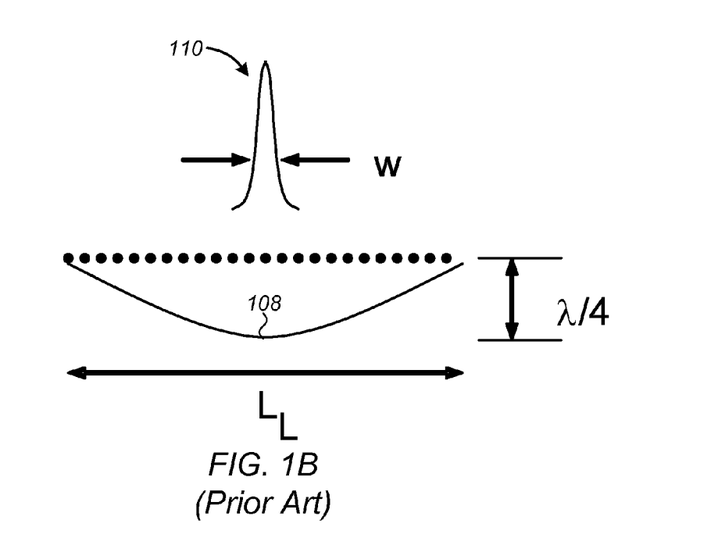
FIG. 1B (Prior Art) is a schematic block diagram of a side view of a deflected active ribbon of the array of ribbon-type diffractors of FIG. 1A.

One shortcoming of existing ribbon-type diffractors is that when a potential difference is applied between the active ribbons and substrate the active ribbons are deflected into a parabolic profile as shown in FIG. 1B. As a result the square-well diffraction grating is established only in a narrow region near the center-line of the array that is truly displaced by a quarter wavelength ($\lambda/4$). Regions outside this optical "sweet-spot" are neither parallel to the device surface nor displaced by $\lambda/4$ and cannot provide high contrast and high efficiency modulation. For this reason, illumination onto the standard ribbon-type diffractor array must be carefully shaped into a line focus. A rule of thumb is that the width of the illumination should be roughly on the order of $1/10^{th}$ to $1/3^{rd}$ the ribbon length, depending on the application and contrast ratio demands.

The need to concentrate the illumination along a narrow line-width in the middle of the array leads to a number of problems. First, line-illumination concentrates laser power in a thin, high power density line, creating a thermal knife-edge having enormous thermal gradients. Moreover, as power density is pushed higher in applications such as in Computer Thermal Printing (CTP) and maskless lithography these thermal gradients can increase to the point where the ribbons begin to fail. Typically, the failure mode is the "Soret effect" in which atoms of a reflective metal, such as aluminum, covering the ribbons physically migrate along from a hotter to a cooler region of the ribbon. This migration of metal atoms can reduce the reflection and hence the efficiency of the SLM, and ultimately shortens useful device life.

Accordingly, there is a need for a new SLM and method of operating the same to provide increased operating lifetime of the SLM.

SUMMARY

A monolithic integrated spatial light modulator (SLM) assembly including multiple linear arrays and methods of manufacturing and using the same are provided.

In a first aspect, the SLM assembly includes a system including spatial light modulators with multiple one-dimensional (1D) diffractor arrays and methods of operating the same are provided. Generally, the system comprises: (i) a spatial light modulator (SLM) assembly including a multiple of 1D diffractor arrays to modulate light from a light source, the multiple of 1D diffractor arrays integrally formed on a die; (ii) illumination optics disposed in a light path between the multiple of 1D diffractor arrays and the light source to illuminate a substantially linear portion of at least one of the multiple of 1D diffractor arrays; and (iii) imaging optics disposed in a light path between the SLM assembly and an image plane on a target-substrate, the imaging optics adapted to transmit modulated light from the SLM assembly to a substantially linear portion of the image plane. In one embodiment, the SLM assembly comprises a multiple of electrostatically deflectable ribbons supported by structures supporting above a surface of the die, and wherein the support structures divide each of the multiple of electrostatically deflectable ribbons into regions along a long axis substantially perpendicular to long axes thereof to form the multiple of 1D diffractor arrays.

In another aspect of the present invention, the method includes steps of: (i) illuminating a substantially linear portion of at least one of a multiple of 1D diffractor arrays integrally formed on a die in a spatial light modulator (SLM) assembly using light from a light source; (ii) modulating the light using at least one of the multiple of 1D diffractor arrays; and (iii) transmitting modulated light from at least one of the multiple of 1D diffractor arrays to a substantially linear portion of an image plane on a target-substrate using imaging optics disposed in a light path between the SLM assembly and the target-substrate. In some embodiments, either the SLM assembly or the illumination optics further comprises a mechanism to select which one of the multiple of 1D diffractor arrays is illuminated, and the further comprises selecting which one of the multiple of 1D diffractor arrays is to be illuminated using the mechanism. Optionally, the mechanism is automatically controlled by a system controller, which may be adapted to alternately select different arrays to be illuminated from among the multiple of 1D diffractor arrays, so that all of the diffractor arrays age at the same rate.

In other embodiments, the illumination optics are adapted to illuminate a multiple of the 1D diffractor arrays at the same time, and the imaging optics are adapted to combine and transmit modulated light from the illuminated 1D diffractor arrays, and the method comprises dividing light from a light source to illuminate each of the multiple of 1D diffractor arrays, and combining and transmitting the modulated light from the multiple of 1D diffractor arrays to a substantially linear portion of the image plane on the target-substrate.

BRIEF DESCRIPTION OF THE DRAWINGS

These and various other features of systems including spatial light modulators with multiple one-dimensional (1D) diffractor arrays and to methods of operating the same will be apparent upon reading of the following detailed description in conjunction with the accompanying drawings and the appended claims provided below, where:

DETAILED DESCRIPTION

The present invention is directed to spatial light modulator (SLM) assemblies having multiple one-dimensional (1D) arrays of diffractors and to methods of operating the SLM assemblies to improve the performance and reliability of the same.

SLM assemblies having multiple 1D diffractor arrays according to the present invention will now be described with reference to FIGS. 2 through 8. For purposes of clarity, many of the details of spatial light modulators in general and ribbon-type spatial light modulators in particular that are widely known and are not relevant to the present invention have been omitted from the following description. The drawings described are only schematic and are non-limiting. In the drawings, the size of some of the elements may be exaggerated and not drawn to scale for illustrative purposes. The dimensions and the relative dimensions may not correspond to actual reductions to practice of the invention.

Figure 2:
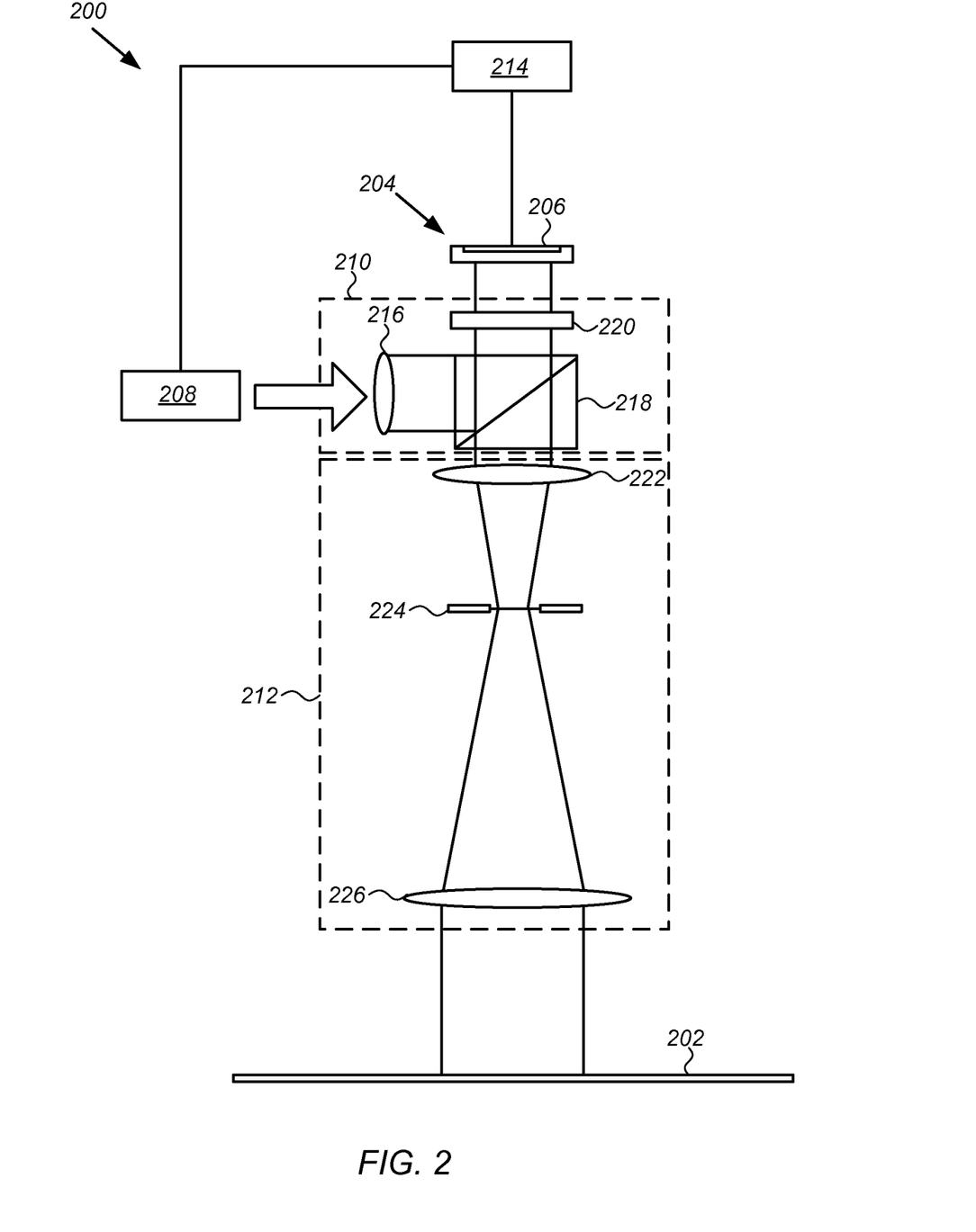
FIG. 2 is a schematic block diagram of a imaging system including a SLM assembly with multiple one-dimensional (1D) diffractor arrays according to an embodiment of the present invention.

An imaging system including a SLM assembly with multiple 1D diffractor arrays according to an embodiment of the present invention will now be described with reference to FIG. 2. FIG. 2 is a schematic block diagram of a lithographic system 200 to project an image on a target-substrate 202, such as a wafer on which semiconductor circuits or Micro-Electromechanical System (MEMS) devices are to be fabricated. The lithographic system 200 includes a SLM assembly 204 having multiple 1D diffractor arrays 206 therein, a light source 208, illumination optics 210, imaging optics 212, and a controller 214 to control operation of the SLM assembly and the light source. For example, the controller 214 can be configured to receive image data from a data processor (not shown) and provide voltages or signals to the SLM assembly 204 to drive diffractors in the multiple 1D diffractor arrays 206 therein, to modulate light incident thereon and to project a substantially linear portion of an image to an image plane on the target-substrate 202. Optionally or preferably the system 200 further includes a mechanism (not shown), also controlled by the controller 214, to provide relative motion between the target-substrate 202 and the linear portion of the image projected thereon to enable the system to project substantially the entire image thereon.

Generally, the illumination optics 210 can include a number of elements, such as lenses 216, mirrors, prisms and/or diffraction gratings, designed to transfer a light beam from the light source 208, such as an Ultra Violet laser, to the SLM assembly 204 to illuminate at least one of multiple 1D diffractor arrays 206 therein. In the embodiment shown, the illumination optics further includes a polarizing beam splitter (PBS) 218, which splits incoming light into two beams of differing polarization. For example, the PBS 218 can be adapted to reflect light having a Transverse-Electric (TE) polarization towards the SLM assembly 204, and to transmit light having a Transverse-Magnetic (TM) polarization toward the target-substrate 202. The light that is initially directed toward the SLM assembly 204 by the PBS 218 in the TE state will pass twice through a quarter-wave plate (QWP) 220 in the illumination optics 210, thus converting it to TM polarization and allowing to pass through the PBS and on to the imaging optics 212 that follow.

As shown, the imaging optics 212 can include magnification and filtering elements, such as a first Fourier Transform (FT) lens 222 to focus and direct light from the SLM assembly 204 onto a FT filter 224 to select $0^{th}$ order modulated light, and a second, larger Inverse FT lens 226 to enlarge the image generated by the SLM assembly and project it onto the target-substrate 202.

Figure 3:
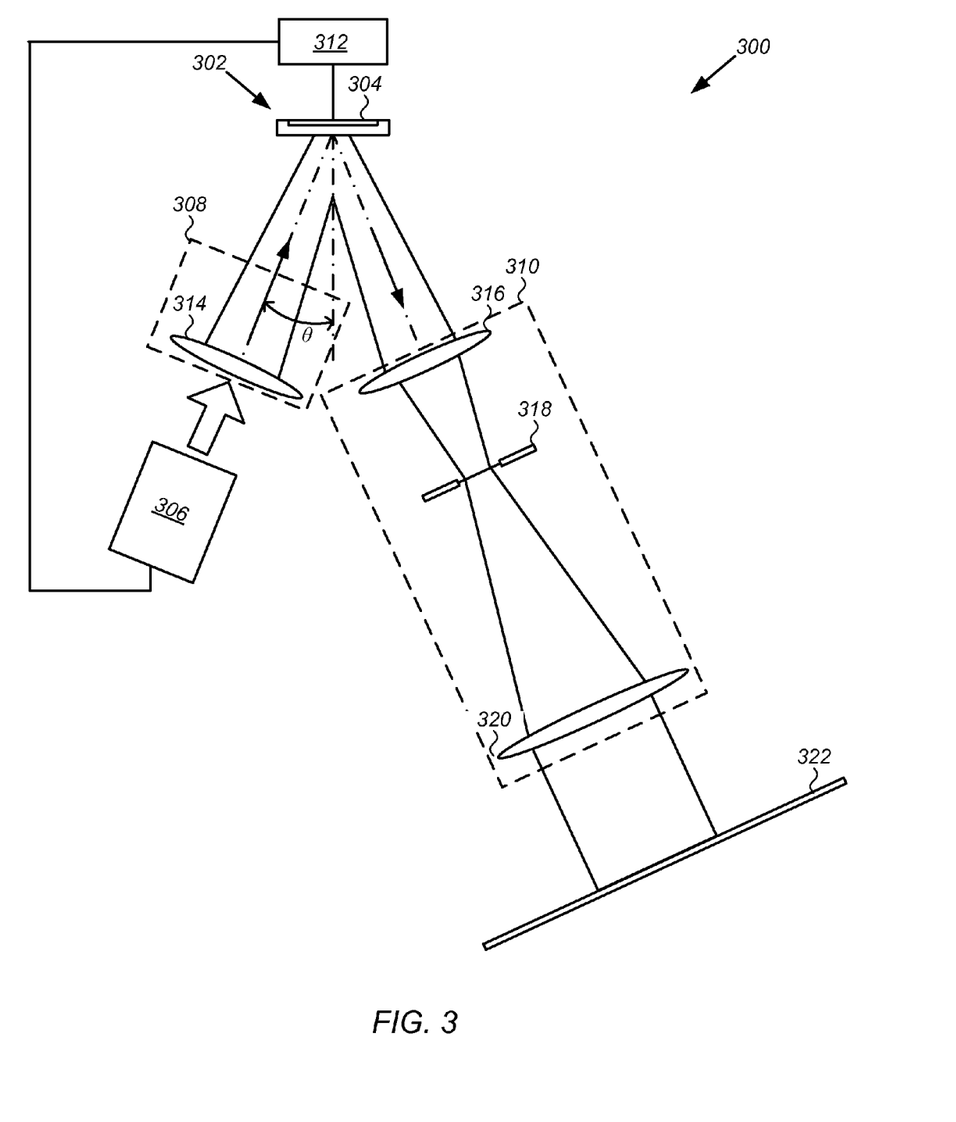
FIG. 3 is a schematic block diagram of a imaging system including a SLM assembly with multiple one-dimensional (1D) diffractor arrays according to another embodiment of the present invention.

In another embodiment, shown in FIG. 3, the imaging system 300 can be an off-axis system in which the incoming light strikes the SLM assembly 302 at an oblique angle (θ) rather than perpendicularly to reflective surfaces of multiple 1D diffractor arrays 304 therein. Referring to FIG. 3, the imaging system 300 can further include a light source 306, illumination optics 308, imaging optics 310, and a controller 312 to control operation of the SLM assembly and the light source. As with the embodiment described above with respect to FIG. 2, the illumination optics 308 can include a number of elements, such as lenses 314, mirrors, prisms and/or diffraction gratings, designed to transfer a light beam from the light source 306 to the SLM assembly 302. The imaging optics 310 can include magnification and filtering elements, such as a first FT lens 316 to focus and direct light from the SLM assembly 302 onto a FT filter 318 to select $0^{th}$ order modulated light, and a second, larger Inverse FT lens 320 to enlarge the image generated by the SLM assembly and project it onto the target-substrate 322.

Figure 4:
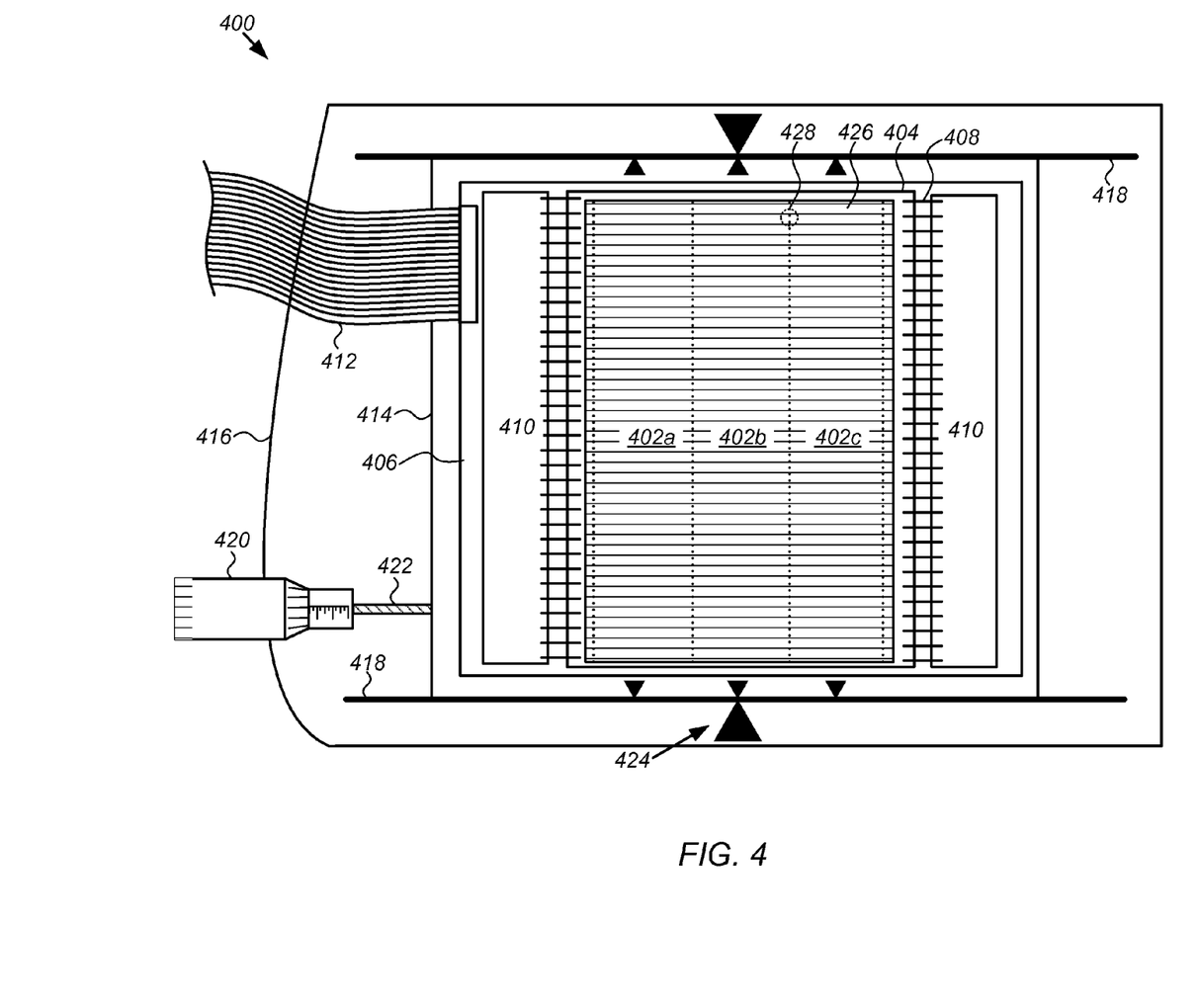
FIG. 4 is a schematic block diagram in plan view of a SLM assembly including multiple 1D diffractor arrays according to an embodiment of the present invention.

A plan view of an embodiment of an SLM assembly 400 including multiple 1D diffractor arrays 402a, 402b, 402c, is shown in FIG. 4. Referring to FIG. 4, the diffractor arrays 402a, 402b, 402c, are integrally formed on a single die 404 that is physically mounted to a substrate, such as a printed circuit board (PCB) 406, and electrically coupled thereto through a number of electrical connections, such as wirebonds 408, to a number of electronic elements or integrated circuits (ICs) 410 on the PCB to receive signals to operate or drive the multiple 1D diffractor arrays. Alternatively, the die 404 can be both physically and electrically coupled to the PCB 406 through a number of solder bumps or a ball-grid-array to metallized pads on a backside of the die, and through traces (not shown) in the PCB 406 to the ICs 410. The PCB 406 is further electrically coupled a flexible electrical connector 412 to an external a data processor, power supply or other components in a system in which the SLM assembly 400 is used.

The PCB 406 is affixed or mounted to a back-plane 414, such as an inside surface of a package, which is movably attached to a bracket or mount 416. By movably attached it is meant that the back-plane 414 or package enclosing the PCB 406 is attached to the mount 416 by fasteners or a mechanism to enable the back-plane to be repositioned relative to the mount to select which one of the multiple 1D diffractor arrays 402a, 402b, 402c, is to be illuminated using illumination optics (not shown in this figure) of a system including the SLM assembly 400. It will be understood that given the size and in particular the width of each of the diffractor arrays 402a, 402b, 402c, the distance by which the back-plane 414 needs to be repositioned relative to the mount 416 is very small. Generally, a single diffractor array has width or ribbon length of less than about 1 mm and more typically from about 0.05 mm to about 1 mm. Thus, the distance by which the back-plane 414 needs to be repositioned relative to the mount 416 is also very small, typically from about 0.05 mm to about 1 mm, depending on the number of 1D diffractor arrays 402a, 402b, 402c, in the SLM assembly 400. It will further be understood that for the same reason, i.e., the fine dimensions of the 1D diffractor arrays 402a, 402b, 402c, the distance by which the back-plane 414 is repositioned relative to the mount 416 must be very precisely controlled, typically within 5 µm, or less.

The mechanism to reposition the back-plane 414 relative to the mount 416 can be manually operated by a system operator or automatically operated by a system controller. In the embodiment shown, mechanism can include one or guides 418 on the back-plane or mount to position or limit movement of the back-plane in one or more directions, and adjustment device, such as a micrometer 420 attached to the mount and through a lead screw or shaft 422, to the back-plane. The back-plane 414 and/or the mount 416 can further include alignment marks or features 424 to facilitate alignment of the diffractor arrays 402a, 402b, 402c with the line illumination from the illumination optics.

Referring again to FIG. 4, the IC 410 can include, for example, a number of drive channels or drivers to provide voltages to drive the multiple 1D diffractor arrays 402a, 402b, 402c. Optionally, the IC 410 or ICs can further include a system controller, as described above with respect to FIG. 2, configured to receive image data from a data processor, provide signals to the drivers to provide voltages to drive the multiple 1D diffractor arrays 402a, 402b, 402c, and to control operation of the SLM assembly 400 and a light source (not shown in this figure).

Each of the multiple 1D diffractor arrays 402a, 402b, 402c, include and is made up or formed from a section or region of a shared multiple of electrostatically deflectable ribbons 426, each of the electrostatically deflectable ribbons having a long axis substantially perpendicular to long axes of the multiple 1D diffractor arrays. The electrostatically deflectable ribbons 426 are supported above a surface of the die 404 by a multiple of support structures 428. Preferably, as in the embodiment shown, the support structures 428 divide each of the multiple of electrostatically deflectable ribbons 426 along the long axis thereof into regions to form the multiple of 1D diffractor arrays 402a, 402b, 402c.

Figure 5A:
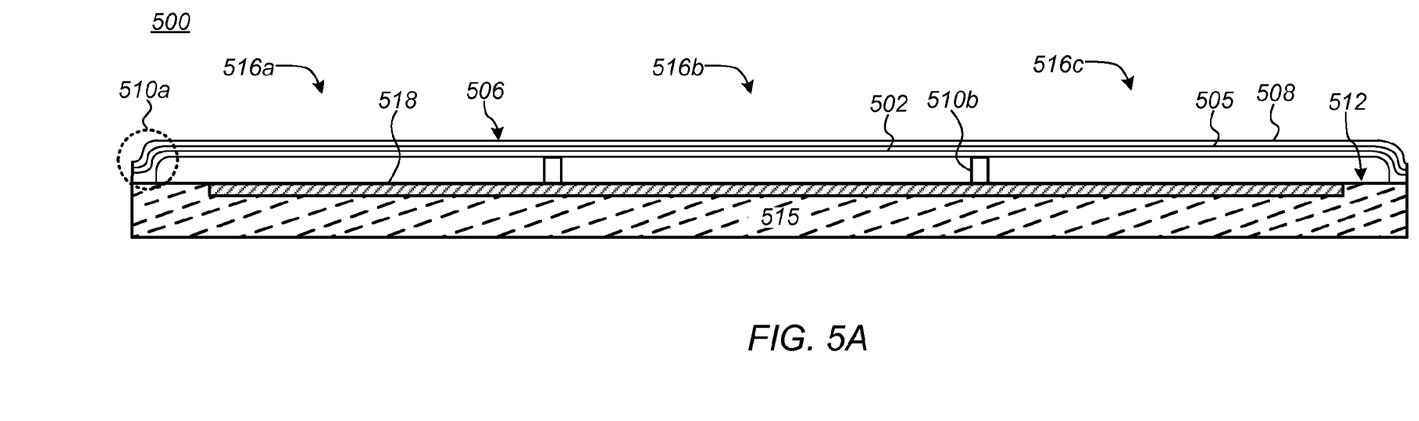
FIGS. 5A and 5B are schematic block diagrams of a sectional side view of a single diffractor ribbon in a SLM assembly including multiple 1D diffractor arrays according to embodiments of the present invention.
Figure 5B:
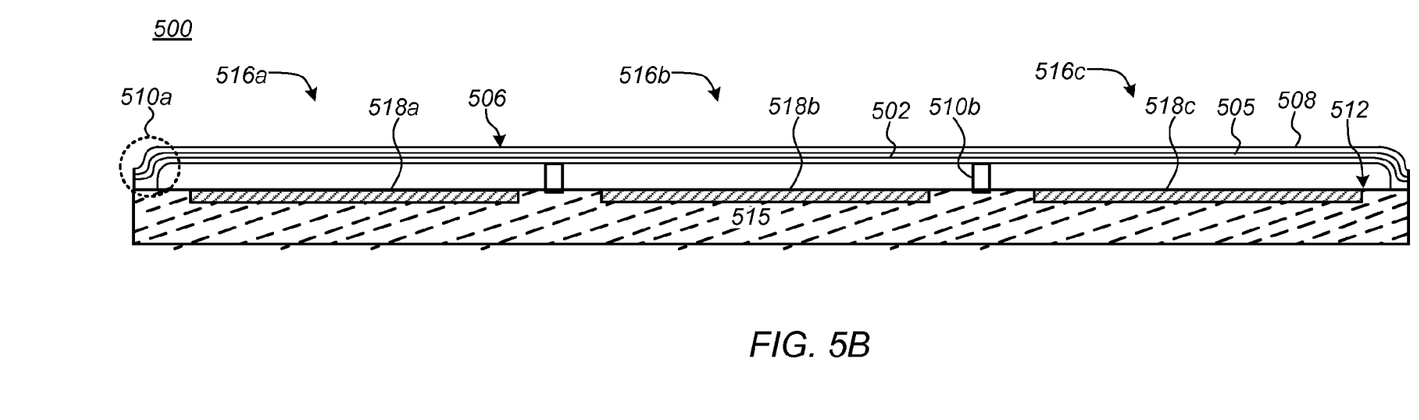

The electrostatically deflectable ribbons in a SLM assembly including multiple 1D diffractor arrays according to different embodiments will now be described in greater detail with reference to FIGS. 5A and 5B. FIGS. 5A and 5B are sectional side views of a single diffractor ribbon taken along a longitudinal axis thereof.

Referring to FIG. 5A, in a first embodiment, the ribbon 500 includes an elastic mechanical layer 502, a ribbon electrode or conducting layer 504 and a reflective surface 506 overlying the mechanical layer and conducting layer. In certain embodiments, such as that shown in FIGS. 5A and 5B, the reflective surface 506 can be formed on or from a separate reflective layer 508, discrete from and overlying the conducting layer 504. In other embodiments, not shown, the reflective surface 506 can be formed on or from the conducting layer 504.

The ribbon 500 further includes a multiple of support structures 510 to support the ribbon above a surface 512 of a substrate 514, and, in accordance with the present invention to divide the ribbon 500 along a long axis thereof into a multiple regions 516a, 516b, 516c, to form multiple 1D diffractor arrays. The support structures 510 include portions 510a of the mechanical layer 502, conducting layer 504 and reflective layer 508 at the ends of the ribbon that turn down to abut the surface 512 of the substrate 514, and a number of posts 510b, typically made of a dielectric material such as silicon-nitride ($Si_3N_4$) and supporting and dividing the ribbon 500 in a middle or central portion thereof.

Generally, the mechanical layer 502 comprises a taut silicon-nitride film ($Si_3N_4$), and flexibly supported above the surface 512 of the substrate 514 by support structures 510. The conducting layer 504 can be formed over and in direct physical contact with the mechanical layer 502, as shown, or underneath the mechanical layer. The conducting layer 504 can include any suitable conducting or semiconducting material compatible with standard MEMS fabrication technologies. For example, the conducting layer 504 can include an amorphous or polycrystalline silicon (poly) layer, or a titanium-nitride (TiN) layer. Alternatively, if the reflective surface 506 is formed on or from the conducting layer 504, the conductive layer could also be metallic.

The separate, discrete reflecting layer 508, where included, can include any suitable metallic, dielectric or semiconducting material compatible with standard MEMS fabrication technologies, and capable of being patterned using standard lithography and etching techniques to form the reflective surface 506.

Referring to FIG. 5A, in operation the ribbon 500 is deflected towards the surface 512 of the substrate 514 by electrostatic forces generated when a voltage is applied between the conducting layer 504 and a base electrode 518 formed in or on the substrate. The applied voltages are provided by a drive channel or driver (not shown in these figures) by applying a time varying voltage signal to the conducting layer 504 of one or more of the ribbons in an array while a fixed voltage or potential is applied to the base electrode 518. The multiple of 1D diffractor arrays are electrically coupled in parallel between common driver channels of the SLM assembly. Light reflected from the ribbon 500 adds as vectors of magnitude and phase with that reflected from adjacent ribbons (not shown in these figures), thereby modulating light reflected from a diffractor array.

In the embodiment shown in FIG. 5A, the base electrode 518 is a single, substantially continuous electrode extending underneath the ribbon along a long axis thereof, and substantially across the entire portion of a die (not shown in this figure) underlying the multiple of ribbons. It will be understood that by electrically coupling common driver channels to each of the ribbons making up a multiple of 1D diffractor arrays, each of the multiple of 1D diffractor arrays are simultaneously driven in parallel. Because the capacitance of the ribbons is low relative to the internal impedance of the driver, and a parasitic capacitance of the diffractor arrays, simultaneously driving the multiple of 1D diffractor arrays does not impact the driver output. Thus, when one of a multiple of 1D diffractor arrays can no longer be used due to migration, contamination and/or chemical transformation of material of the reflective surface 506, illumination can be moved to another one of the multiple of 1D diffractor arrays. No additional drivers or complexity of the driver is required.

In another embodiment shown in FIG. 5B, the base electrode 518 includes a number n of electrically separate, individual base electrodes 518a, 518b, 518c, where n is equal to the number of the multiple of 1D diffractor arrays, and each individual base electrode underlies one of the regions 516a, 516b, or 516c of the multiple of ribbons corresponding to or making up one of the multiple of 1D diffractor arrays. It will be understood that in this embodiment that the non-illuminated 1D diffractor arrays in the multiple of 1D diffractor arrays can be electrically turned off by decoupling the individual base electrodes 518a, 518b, or 518c, from the driver, or by applying equal voltages to the ribbon and base electrode.

Figure 6:
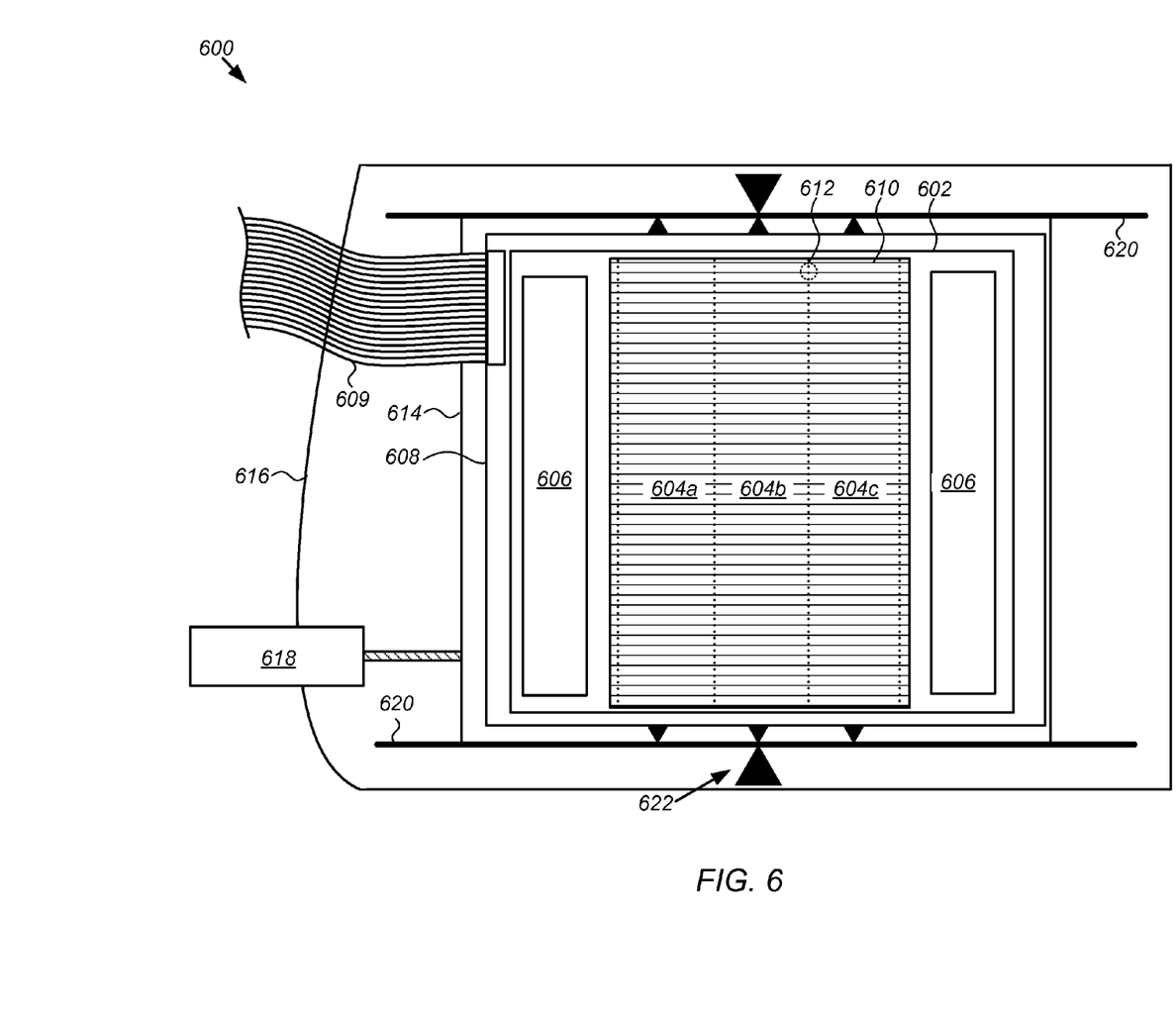
FIG. 6 is a schematic block diagram in plan view of another embodiment of a SLM assembly including multiple 1D diffractor arrays integrally formed with drivers therefor on a shared substrate according to the present invention.

Another embodiment of an SLM assembly 600 is shown in FIG. 6. Referring to FIG. 6, SLM assembly 600 includes a single die 602 on which multiple of 1D diffractor arrays 604a, 604b, 604c and a number of ICs 606, such as drivers and, optionally, a system controller, are integrally formed. The multiple 1D diffractor arrays 604a, 604b, 604c, are electrically coupled to the drivers and/or the system controller in the ICs 606 through local interconnects in the die 602. The die 602 can be both physically and electrically coupled to a PCB 608 through a number of solder bumps or a ball-grid-array to metallized pads on a backside of the die. The die 604 can be further electrically coupled through a flexible electrical connector 610 to an external data processor, power supply or other components in the system in which the SLM assembly 600 is used.

As with the embodiment described above with respect to FIG. 4, each of the multiple 1D diffractor arrays 604a, 604b, 604c, include and is made up or formed from a section or region of a shared multiple of electrostatically deflectable ribbons 610, supported above a surface of the die 602 by a multiple of support structures 612. The support structures 612 divide each of the multiple of electrostatically deflectable ribbons 610 along the long axis thereof into regions to form the multiple of 1D diffractor arrays.

The PCB 608 is affixed or mounted to a back-plane 614, such as an inside surface of a package, which is movably attached to a bracket or mount 616 to select which one of the multiple 1D diffractor arrays 604a, 604b, 604c, is to be illuminated using illumination optics of a system (not shown in this figure) including the SLM assembly 600. In the embodiment shown, the mechanism to reposition the back-plane 614 relative to the mount 616 includes an actuator 618 that can be manually operated by a system operator or automatically operated by a system controller. Suitable actuators include but are not limited to, a piezoelectric motor or piezo motor, ultra-sonic drive, stepper motor or linear motor. In some embodiments, such as that shown, the mechanism further includes one or more guides 620 on the back-plane 614 and/or mount 616 to position or limit movement of the back-plane in one or more directions, and alignment marks or features 622 on the back-plane and/or mount facilitate the repositioning.

In one particularly advantageous embodiment, the system controller is adapted or configured to periodically switch the illumination among the multiple 1D diffractor arrays 604a, 604b, 604c so that all age at substantially the same rate.

Figure 7:
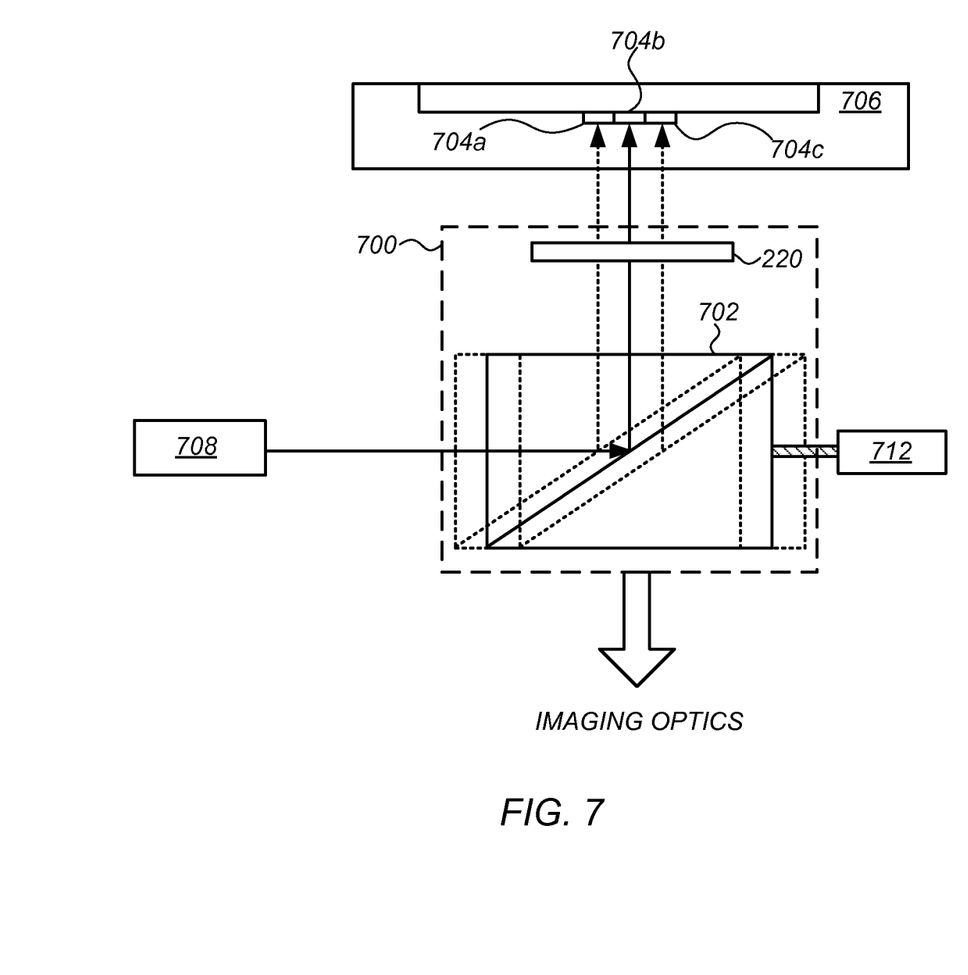
FIG. 7 is a schematic block diagram of another embodiment of part of a system including a SLM assembly with multiple 1D diffractor arrays and illumination optics to selectively illuminate one of the multiple 1D diffractor arrays according to the present invention.

In another embodiment, the illumination optics comprise a mechanism to select which one of the plurality of 1D diffractor arrays is illuminated by the illumination optics. FIG. 7 is a diagram of part of a system including a SLM assembly with multiple 1D diffractor arrays including illumination optics adapted to selectively illuminate one of the multiple 1D diffractor arrays. Referring to FIG. 7, in one embodiment the illumination optics 700 include a movable element, such as a polarizing beam splitter (PBS) 702, that can be translated or repositioned to select which one of the multiple 1D diffractor arrays 704a, 704b, 704c, in a SLM assembly 706 is illuminated by light from a light source 708. In those embodiments in which the movable element is or includes a PBS 702, the illumination optics 700 further includes a quarter-wave plate (QWP) 710 to convert light passing therethrough to TM polarization and allowing to pass through the PBS and on to imaging optics (not shown) that follow.

The movable element (PBS 702) can be manually repositioned by a system operator, or repositioned using an electric actuator 712, such as a piezoelectric motor or piezo motor, ultra-sonic drive, stepper motor or linear motor. In one particularly advantageous embodiment, the movable element (PBS 702) can be automatically repositioned by a system controller using the actuator 712 to periodically switch the illumination among the multiple 1D diffractor arrays 704a, 704b, 704c, so that all age at substantially the same rate.

Figure 8:
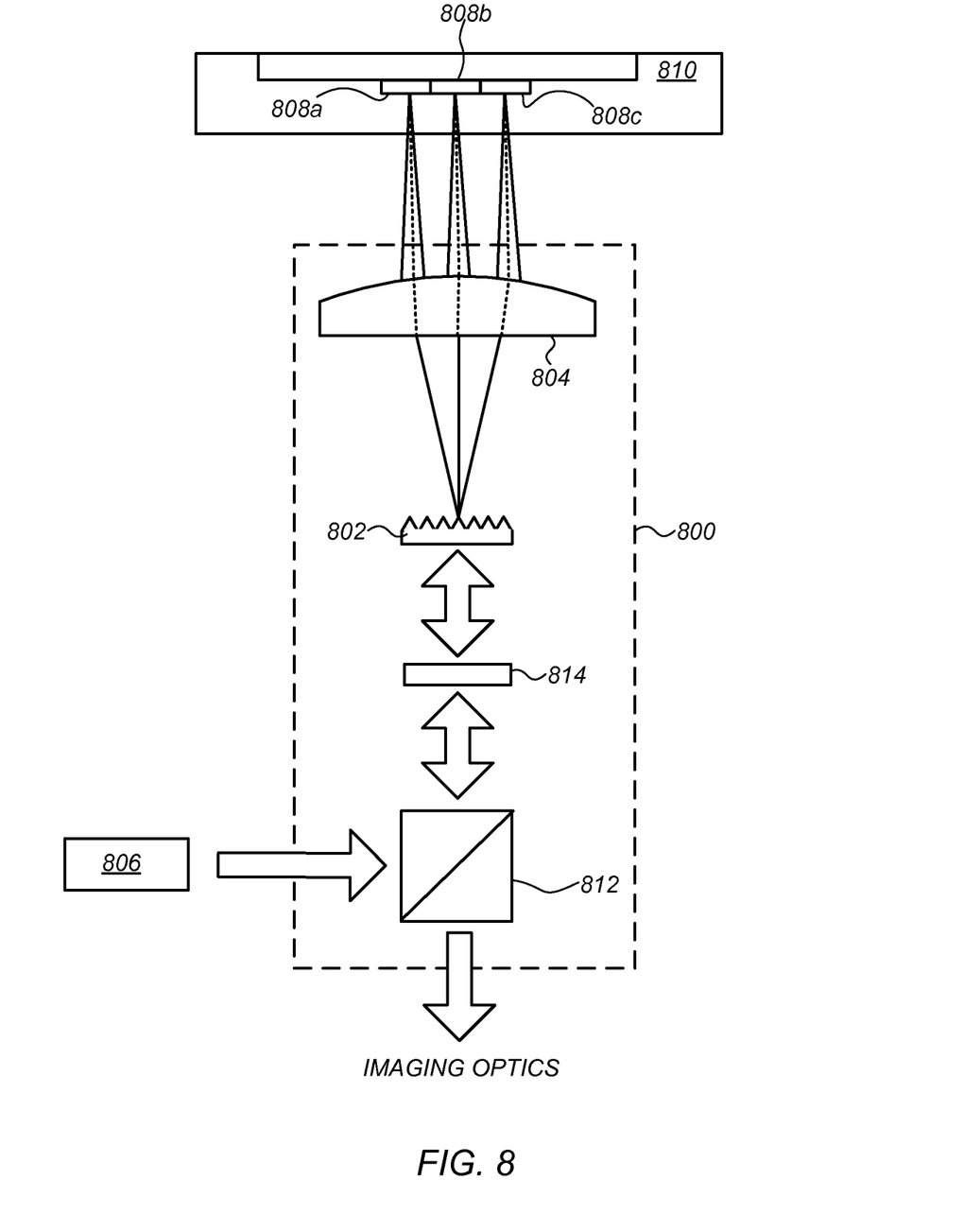
FIG. 8 is a schematic block diagram of another embodiment of part of a system including a SLM assembly with multiple 1D diffractor arrays and illumination optics to simultaneously illuminate all of the multiple 1D diffractor arrays according to the present invention.

In yet another embodiment, shown in FIG. 8, the illumination optics 800 include a diffraction grating 802 and a collimating lens 804 to continuously divide light from a light source 806 substantially equally among multiple 1D diffractor arrays 808a, 808b, 808c, in a SLM assembly 810. As with the embodiment of the system shown in FIG. 2 above, the illumination optics further includes a polarizing beam splitter (PBS) 812 and a quarter-wave plate (QWP) 814, which reflects light having a first polarization onto the SLM assembly 810, and transmits the light having a second polarization from the SLM assembly on to imaging optics (not shown) that follow, and towards a target-substrate. The diffraction grating 802 splits the incoming light into a number of beams of approximately equal power. Thus, while a total power density of light modulated by the SLM assembly 810 remains substantially unchanged, power density of light incident on each of the multiple 1D diffractor arrays 808a, 808b, 808c is a substantially lower fraction of the total power density, thereby extending an operating lifetime of the SLM assembly.

Figure 9:
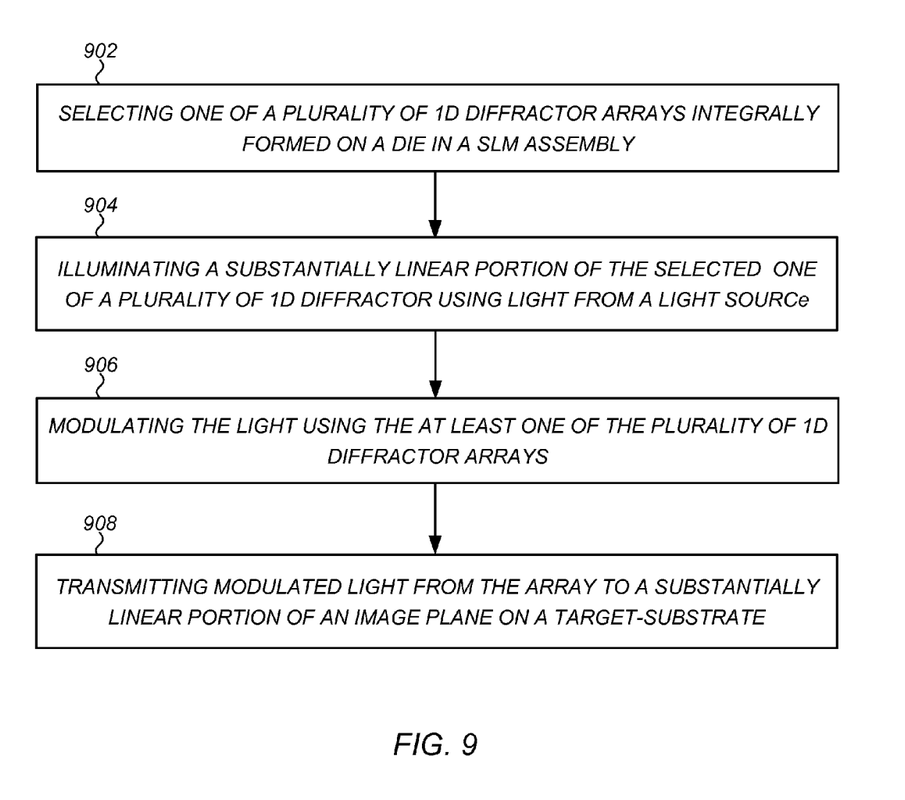
FIG. 9 is a flow diagram illustrating an embodiment of particular modules employed in a method for operating a system including a SLM assembly with multiple 1D diffractor arrays according to an embodiment of the present invention.

A method for operating a system including a SLM assembly with multiple 1D diffractor arrays according to an embodiment of the present invention will now be described with reference to the flow diagram of FIG. 9. Referring to FIG. 9, the method begins with selecting one of multiple 1D diffractor arrays integrally formed on a die in a SLM assembly (module 902). The particular 1D diffractor array selected can be selected either by repositioning a PCB on which the die with multiple 1D diffractor arrays formed thereon as described above in connection with FIGS. 4 and 6, or by reconfiguring the illumination optics as described above in connection with FIG. 7. Next, a substantially linear portion of the selected 1D diffractor array is illuminated using light from a light source (module 904). Light incident on the selected 1D diffractor array is modulated using the selected 1D diffractor array (module 906). Finally, the modulated light is transmitted from the selected 1D diffractor array to a substantially linear portion of an image plane on a target-substrate using imaging optics disposed in a light path between the SLM assembly and the target-substrate (module 908).

Figure 10:
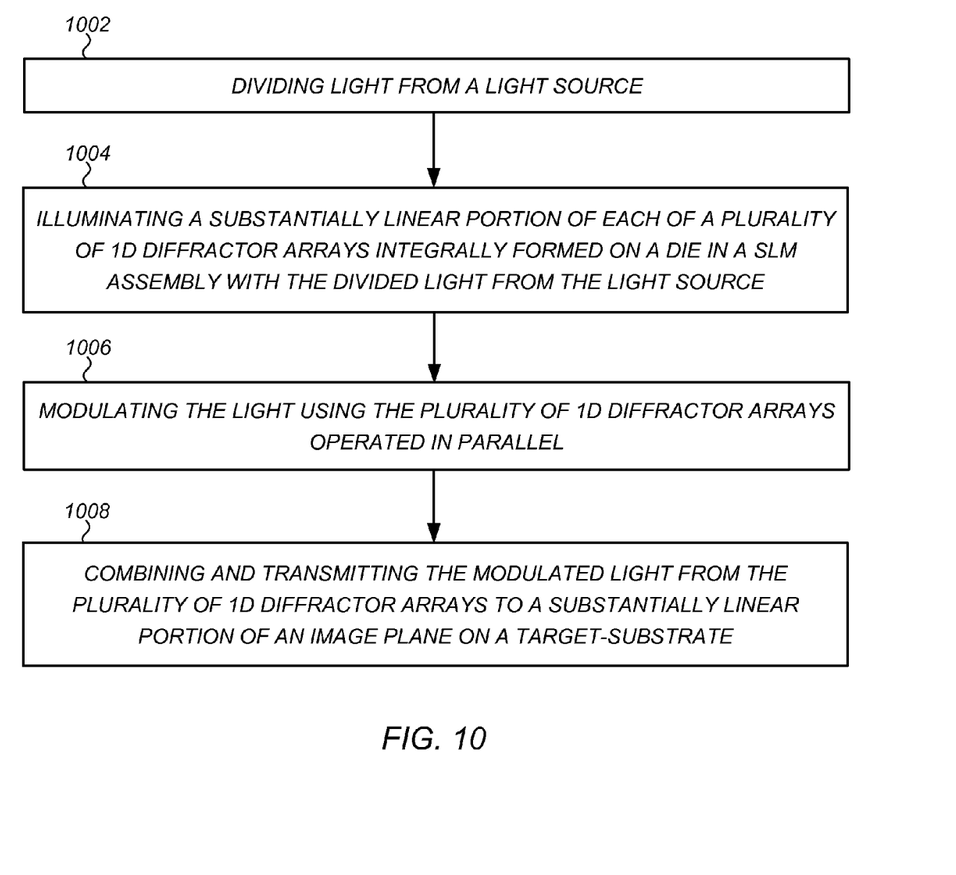
FIG. 10 is a flow diagram illustrating an embodiment of particular modules employed in a method for operating a system including a SLM assembly with multiple 1D diffractor arrays according to another embodiment of the present invention.

A method for operating a system including a SLM assembly with multiple 1D diffractor arrays according to another embodiment will now be described with reference to the flow diagram of FIG. 10. Referring to FIG. 10, the method begins with dividing light from a light source (module 1002). As described above in connection with FIG. 8, the light can be divided using a diffraction grating adapted to illuminate each one of multiple 1D diffractor arrays integrally formed on a die in a SLM assembly at the same time. Next, a substantially linear portion of each of the multiple 1D diffractor arrays is illuminated with the divided light from the light source (module 1004). Light incident on the SLM assembly is modulated using the multiple 1D diffractor arrays operated in parallel (module 1006). Finally, modulated light from the multiple 1D diffractor arrays is combined and transmitted to a substantially linear portion of an image plane on a target-substrate (module 1008).

Thus, embodiments of SLMs having multiple 1D diffractor arrays and methods of making and using the same have been described. Although the present disclosure has been described with reference to specific exemplary embodiments, it will be evident that various modifications and changes may be made to these embodiments without departing from the broader spirit and scope of the disclosure. Accordingly, the specification and drawings are to be regarded in an illustrative rather than a restrictive sense.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

In the forgoing description, for purposes of explanation, numerous specific details have been set forth in order to provide a thorough understanding of the control system and method of the present disclosure. It will be evident however to one skilled in the art that the present interface device and method may be practiced without these specific details. In other instances, well-known structures, and techniques are not shown in detail or are shown in block diagram form in order to avoid unnecessarily obscuring an understanding of this description.

Reference in the description to "one embodiment" or "an embodiment" means that a particular feature, structure, or characteristic described in connection with the embodiment is included in at least one embodiment of the control system or method. The appearances of the phrase "one embodiment" in various places in the specification do not necessarily all refer to the same embodiment. The term "to couple" as used herein may include both to directly electrically connect two or more components or elements and to indirectly connect through one or more intervening components.

What is claimed is:

1. A system comprising:
a spatial light modulator (SLM) assembly including a plurality of one-dimensional (1D) diffractor arrays to modulate light from a light source, the plurality of 1D diffractor arrays integrally formed on a die;
illumination optics disposed in a light path between the plurality of 1D diffractor arrays and the light source to illuminate a substantially linear portion of at least one of the plurality of 1D diffractor arrays; and
imaging optics disposed in a light path between the SLM assembly and an image plane on a target-substrate, the imaging optics adapted to transmit modulated light from the SLM assembly to a substantially linear portion of the image plane,
wherein the SLM assembly comprises a plurality of electrostatically deflectable ribbons supported by support structures above a surface of the die, and wherein the support structures divide each of the plurality of electrostatically deflectable ribbons into regions along a long axis thereof to form the plurality of 1D diffractor arrays.

2. The system of claim 1 wherein the plurality of electrostatically deflectable ribbons are electrically coupled in parallel between common driver channels of the SLM assembly to simultaneously drive each of the plurality of 1D diffractor arrays at the same time.

3. The system of claim 1 wherein the plurality of 1D diffractor arrays are electrically coupled in parallel between common driver channels of the SLM assembly.

4. The system of claim 3 wherein the plurality of 1D diffractor arrays are electrically coupled to the common driver channels to simultaneously drive each of the plurality of 1D diffractor arrays in parallel.

5. The system of claim 1 wherein the illumination optics are adapted to illuminate only one of the plurality of 1D diffractor arrays at a time.

6. The system of claim 1 wherein the SLM assembly further comprises a mechanism to position the die relative to the illumination optics to select which one of the plurality of 1D diffractor arrays is illuminated by the illumination optics.

7. The system of claim 6 wherein the mechanism is automatically controlled by a system controller.

8. The system of claim 7 wherein the system controller is adapted to alternately select different arrays from among the plurality of 1D diffractor arrays to be illuminated by the illumination optics.

9. The system of claim 1 wherein the illumination optics comprise a mechanism to select which one of the plurality of 1D diffractor arrays is illuminated by the illumination optics.

10. The system of claim 9 wherein the mechanism is automatically controlled by a controller in the system, and wherein the controller is adapted to alternately select different arrays from among the plurality of 1D diffractor arrays to be illuminated by the illumination optics.

11. The system of claim 1 wherein the illumination optics are adapted to illuminate a plurality of the 1D diffractor arrays at the same time, and the imaging optics are adapted to combine and transmit modulated light from the illuminated 1D diffractor arrays to a substantially linear portion of the image plane.

12. A method comprising:
- providing a plurality of electrostatically deflectable ribbons supported by support structures above a surface of a die in a spatial light modulator (SLM) assembly, wherein the support structures divide each of the plurality of electrostatically deflectable ribbons along a long axis thereof into regions to form a plurality of 1D diffractor arrays;
- illuminating a substantially linear portion of at least one of the plurality of 1D diffractor arrays using light from a light source;
- modulating the light using the at least one of the plurality of 1D diffractor arrays; and
- transmitting modulated light from the at least one of the plurality of 1D diffractor arrays to a substantially linear portion of an image plane on a target-substrate using imaging optics disposed in a light path between the SLM assembly and the target-substrate.

13. The method of claim 12 wherein the SLM assembly further comprises a mechanism to position the die relative to the illumination optics, and further comprising using the mechanism to position the die to select which one of the plurality of 1D diffractor arrays is illuminated.

14. The method of claim 13 wherein the mechanism is automatically controlled by a system controller.

15. The method of claim 14 wherein the system controller is adapted to alternately select different arrays from among the plurality of 1D diffractor arrays to be illuminated by the illumination optics.

16. The method of claim 12 wherein the illumination optics comprise a mechanism to select which one of the plurality of 1D diffractor arrays is illuminated by the illumination optics, and further comprising prior to illuminating a substantially linear portion of at least one of a plurality of 1D diffractor arrays selecting which one of the plurality of 1D diffractor arrays is to be illuminated using the mechanism.

17. The method of claim 16 wherein the mechanism is automatically controlled by a system controller, and wherein the system controller is adapted to alternately select different arrays from among the plurality of 1D diffractor arrays to be illuminated by the illumination optics.

18. A method comprising:
- providing a plurality of electrostatically deflectable ribbons supported by support structures above a surface of a die in a spatial light modulator (SLM) assembly, wherein the support structures divide each of the plurality of electrostatically deflectable ribbons along a long axis thereof into regions to form a plurality of 1D diffractor arrays;
- dividing light from a light source and illuminating a substantially linear portion of each of the plurality of 1D diffractor arrays;
- modulating the light using the plurality of 1D diffractor arrays operated in parallel; and
- combining and transmitting the modulated light from the plurality of 1D diffractor arrays to a substantially linear portion of an image plane on a target-substrate using imaging optics disposed in a light path between the SLM assembly and the target-substrate.

19. The method of claim 18 wherein the illumination optics comprise a diffraction grating adapted to illuminate each of the plurality of 1D diffractor arrays at the same time.

20. The method of claim 18 wherein the plurality of 1D diffractor arrays are electrically coupled in parallel between common driver channels of the SLM assembly, and wherein modulating the light using the plurality of 1D diffractor arrays comprises simultaneously driving each of the plurality of 1D diffractor arrays at the same time.

* * * * *